UNITED STATES PATENT OFFICE.

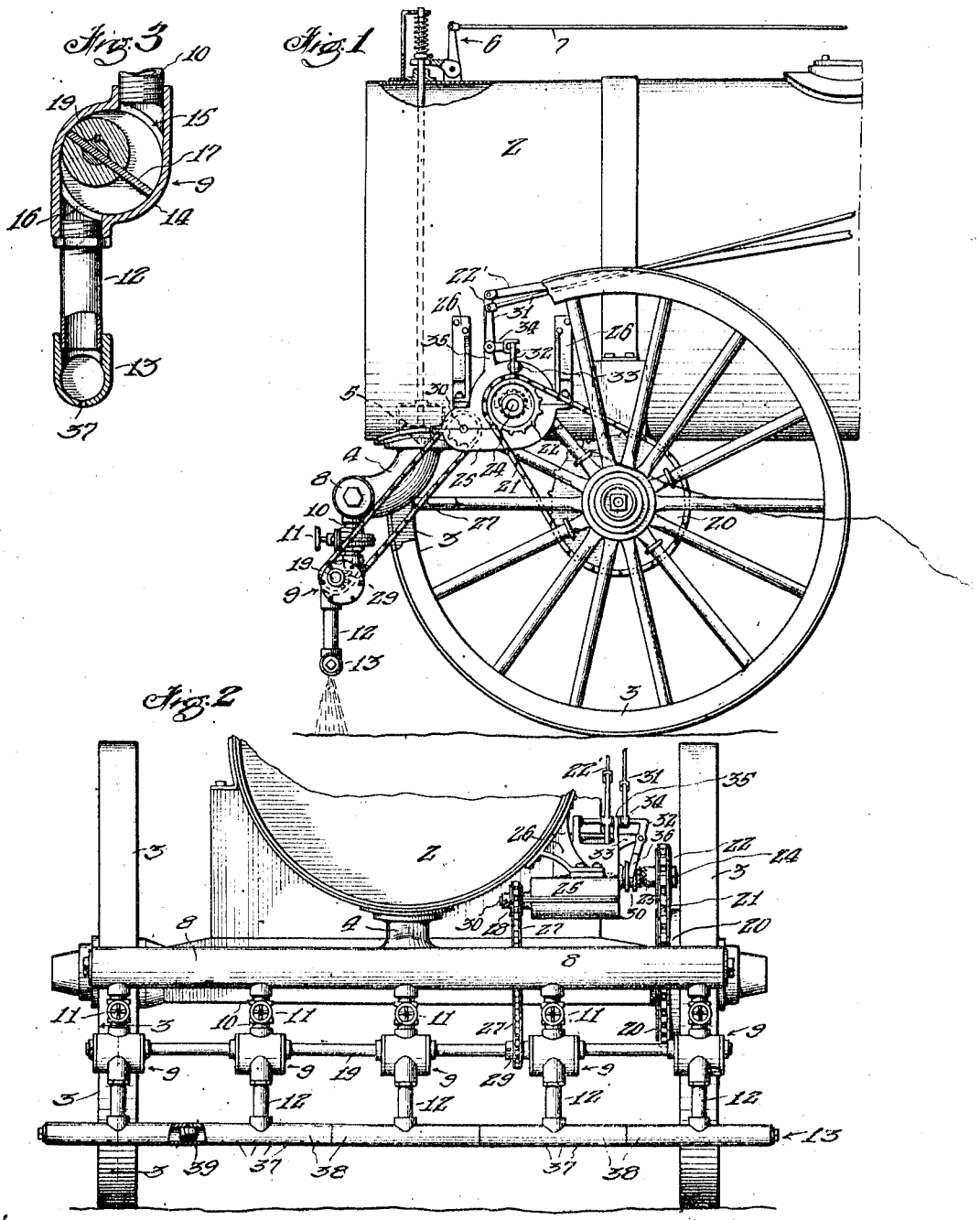

GEORGE D. PARKER, OF RIVERSIDE, CALIFORNIA.

SPRINKLING APPARATUS.

1,021,067. Specification of Letters Patent. Patented Mar. 26, 1912.

Application filed July 1, 1911. Serial No. 636,511.

*To all whom it may concern:*

Be it known that I, GEORGE D. PARKER, a citizen of the United States of America, residing at Riverside, in the county of Riverside, State of California, have invented a certain new and useful Sprinkling Apparatus; and I do hereby declare the following to be a full, clear, and exact description of the invention, such as will enable others skilled in the art to which it appertains to make and use the same.

This invention relates to sprinkling apparatus; and it may be said to consist in the provision of the novel features, and in the novel and improved construction, arrangement and combination of parts and devices in the apparatus as will be apparent from the description and claims hereinafter.

Though the invention is adapted to be used in other relations, it is more particularly designed for use in connection with apparatus for sprinkling oil or other fluid suitable for road-making purposes.

An object of the invention is to provide a novel and improved construction for a sprinkling apparatus which shall permit of adjustment of the apparatus to regulate the amount of fluid delivered on a unit of area of surface of the ground.

Other objects of the invention are to provide a construction for the apparatus which is simple in character, practical and serviceable, easily adjustable, effective in operation, and which also is adapted to be operated to deliver fluid from one or more sections of a sprinkling head.

Other objects and the advantages of the invention will be apparent to those skilled in the art from a consideration of the following description of the preferred form of construction in which the invention may be embodied, taken in connection with the accompanying drawings, in which—

Figure 1 is a partially broken side elevation of a construction for apparatus having the invention embodied therein; Fig. 2 is a partially broken end elevation of the apparatus shown in Fig. 1, and Fig. 3 is a partially broken sectional view of one of the rotary pumps and of parts connected thereto.

As shown in the drawings, a suitable tank 2 suitably mounted on wheels 3 may have connected on the under side thereof a delivery pipe 4 provided with a valve 5 to which is connected suitable operating mechanism 6 adapted to be actuated through the instrumentality of the lever 7 to raise or lower the valve 5 to control the flow of oil or other fluid from the tank through said delivery pipe. The delivery pipe 4 may be connected to a manifold 8 and any suitable form of rotary pumps 9 may be connected to the manifold by means of branch pipes 10 each provided with a valve 11 therein. From the delivery ends of the rotary pumps 9 may lead pipes 12 which are suitably connected to a sprinkler head 13.

As shown in Fig. 3, the rotary pumps 9 may consist of a casing 14 provided with a port 15 in connection with pipe 10 and with a port 16 in connection with pipe 12; the piston 17 of the pump being operatively connected with a countershaft 19 which is common to each of the rotary pumps 9. The countershaft 19 may be driven by any suitable mechanism but is preferably driven through the instrumentality of change speed gear adapted to be operatively connected with one of the wheels 3.

As shown in Figs. 1 and 2, a sprocket wheel 20 may be rigidly connected with the hub of one of the wheels 3 and a chain 21 may pass over the sprocket wheel 20 and also over the sprocket wheel 22 on a clutch sleeve 23 loosely mounted on the shaft 24 which latter is operatively connected with suitable change speed gear contained in casing 25 suitably mounted on a frame 26 affixed to the tank 2; the countershaft 19 preferably being operatively connected with the change speed gear by means of chain 27 passing over sprocket wheels 28 and 29 mounted respectively on the shaft 30 of the change speed gear and on the countershaft 19.

The change speed gear may be operatively connected with and adapted to be actuated by any suitable mechanism connected to the lever 22′ and it may be operatively connected with or disconnected from the sleeve 23 by means of a clutch collar 30 which is suitably mounted on the shaft 24 and may be actuated by means of a lever 31 which is operatively connected with a bell crank 34 pivoted on a suitable stationary part 35; the bell crank 34 being operatively connected to a bell crank 32 which may be arranged at right angles to the bell crank 34 and pivotally mounted on a stationary part 33 and provided with a yoke 36 adapted to engage with the clutch collar 30.

The sprinkler head 13 may be provided with a plurality of perforations 37 and it is preferably made up of sections 38 which may be connected together by any suitable means, that shown consisting of a threaded plug 39 screwed into the ends of adjacent sections. By making the sprinkler head in sections it will be seen that the apparatus may be operated to deliver fluid from one or more of the sections of the sprinkler head as may be desired to suit the width of the surface to be sprinkled.

From the foregoing the mode of operation of the apparatus will be readily understood, it being evident that the sleeve 23 is rotated as the wheels 3 turn and when operatively connected, by means of the clutch mechanism actuated by lever 31, to the change speed gear, the latter transmits motion to the countershaft 19 to operate the pumps 9 to force fluid from the manifold 8 to the sprinkler head 13 to be delivered to the surface of the ground; and it will now readily be understood that the speed at which the countershaft 19 is driven may be controlled by manipulating the lever 22' of the change speed gear to thereby regulate the amount of fluid that the pumps 9 shall deliver to the sprinkler head 13—whereby the amount of fluid that the sprinkler head delivers on a unit of area of the surface of the ground may be controlled by the operator.

While one form of construction in which the invention may be embodied has been illustrated and particularly described, there are many changes and modifications thereof that will readily occur to those skilled in the art; wherefore the right is reserved to all such changes and modifications as do not depart from the spirit and scope of the invention as set forth in the appended claims.

I claim:

1. The combination of a tank mounted on wheels, a sprinkler head, a manifold connected with said tank, a plurality of rotary pumps, a shaft operatively connected in common with said rotary pumps, pipes leading from said manifold to said rotary pumps, said pipes each provided with a valve, pipes leading from the rotary pumps to the sprinkler head, and means for driving said shaft, said means including a change speed gear adapted to be operatively connected with one of said wheels.

2. The combination of a tank mounted on wheels, a sprinkler head made up of sections, a manifold connected with said tank, a shaft, a plurality of rotary pumps mounted on said shaft, pipes leading from said manifold to said rotary pumps, said pipes each provided with a valve, pipes leading from the rotary pumps to said sections, and means for driving said shaft, said means including a change speed gear adapted to be operatively connected with one of said wheels.

3. The combination of a tank mounted on wheels, a sprinkler head made up of sections, a manifold connected with said tank, a plurality of pumps, a shaft operatively connected in common with said pumps, pipes leading from said manifold to said pumps, said pipes each provided with a valve, pipes leading from the pumps to said sections, and means for driving said shaft, said means including a change speed gear adapted to be operatively connected with one of said wheels.

In testimony whereof, I have signed my name to this specification in the presence of two subscribing witnesses at Riverside, county of Riverside, State of California, this 23rd day of June A. D. 1911.

GEORGE D. PARKER.

Witnesses:
RENA E. SMITH,
CHAS. E. JOHNSON.